United States Patent [19]
Bronzino et al.

[11] Patent Number: 4,811,963
[45] Date of Patent: Mar. 14, 1989

[54] AUTOMATIC INDEXING CHUCK FOR ANGULAR STEP-BY-STEP MOVEMENT OF JAWS

[75] Inventors: Walter Bronzino; Pier M. Bronzino, Both of Caprie, Italy

[73] Assignee: Autoblok S.p.A., Caprie, Italy

[21] Appl. No.: 68,487

[22] Filed: Jun. 29, 1987

[30] Foreign Application Priority Data

Jul. 4, 1986 [IT] Italy .................... 67538 A/86

[51] Int. Cl.⁴ .................................. B23B 31/18
[52] U.S. Cl. ........................ 279/5; 279/1 C; 279/4; 91/536; 92/75
[58] Field of Search ........ 279/1 C, 5, 4; 91/536; 92/75

[56] References Cited

U.S. PATENT DOCUMENTS

| | | | |
|---|---|---|---|
| 3,879,045 | 4/1975 | Benjamin et al. | 279/5 |
| 3,880,051 | 4/1975 | Eppler | 91/536 |
| 4,411,440 | 10/1983 | Becker | 279/5 |
| 4,508,357 | 4/1985 | Reich | 279/1 C |

FOREIGN PATENT DOCUMENTS

| | | | |
|---|---|---|---|
| 121202 | 10/1984 | European Pat. Off. | 279/5 |
| 618240 | 2/1961 | Italy | 279/5 |
| 123204 | 7/1985 | Japan | 279/5 |
| 627923 | 10/1978 | U.S.S.R. | 279/5 |
| 761154 | 10/1980 | U.S.S.R. | 279/5 |
| 774817 | 11/1980 | U.S.S.R. | 279/5 |
| 1036965 | 8/1983 | U.S.S.R. | 92/75 |

*Primary Examiner*—Gil Weidenfeld
*Attorney, Agent, or Firm*—Guido Modiano; Albert Josif

[57] ABSTRACT

An automatic indexing chuck comprises a dividing pivot separately and in succession, operated by a dividing shaft and a locking sleeve. The dividing shaft is slideably and sealingly accommodated in a cavity of the locking sleeve which has retention planes for the dividing pivot and is in turn sealingly accommodated in a mandrel body cavity defining two adjacent chambers; the dividing shaft and the locking sleeve defining independent pistons operated by a single hydraulic circuit with reversible inlet and outlet ports, the pistons moving in opposite directions to perform consecutively unlocking, rotation and locking of the dividing pivot.

19 Claims, 3 Drawing Sheets

AUTOMATIC INDEXING CHUCK FOR ANGULAR STEP-BY-STEP MOVEMENT OF JAWS

BACKGROUND OF THE INVENTION

The present invention relates to an automatic indexing chuck for angular step-by-step moving of jaws.

As is known to those skilled in the art, automatic indexing chucks allow, with a single load and a single locking, machining of parts with faces which are mutually orthogonal, or more generally angled to one another, and this occurs by virtue of the action of fluidodynamic and/or mechanical systems adapted to provide a step-by-step angular rotation of the jaws around the radial grip axis and a locking thereof in the subsequent work positions.

Some known indexing systems are based on the use of complicated devices which employ step-by-step angular indexing mechanisms and stop mechanisms for performing rotation and locking which are generally differentiated and operated by fluidodynamic pistons which require accurate synchronization by means of complicated hydraulic and/or electric controls.

More recently, in the attempt to simplify the above described known indexing mechanisms, a device has been proposed and produced which makes use of a single reversible-stroke piston adapted to provide rotation of the so-called indexing or dividing pivot (a prismatic portion of the jaw's supporting pivot) for one direction of the work stroke and locking of said pivot for the reverse stroke direction.

The piston is provided with differentiated active pushing and locking surfaces which act on corresponding faces of a prismatic dividing pivot.

This known and more recent indexing device, described in the Italian patent application No. 20415-A/83 dated Mar. 31, 1983, though simplified, also has remarkable disadvantages, mainly residing in the complicated structure of the piston which bears both pushing and locking surfaces and the corresponding complicated profile of the prismatic portions of the dividing pivot: both these mechanical elements require accurate machining with very small tolerances for a correct operation of the device.

Another serious disadvantage of this known device resides in the bulk of the piston, the axial extension whereof—due to the bidirectionality of the work stroke—is at least double of that of the pistons of the preceding multiple-piston indexing devices. This increases the dimensions of the chuck with a considerable and undesirable increase of the inertial mass thereof. Moreover, the greater axial extension of the piston requires, mechanical rigidity being equal, increased cross sections which penalize further dimensions and inertial masses.

Further disadvantages of this known device reside in the relative slowness of the angular indexing movement, and in the fact that between end of rotation and beginning of locking, coupling between the dividing pivot and the piston is totally released, both disadvantages deriving from the change in direction of the work strokes of the single piston.

SUMMARY OF THE INVENTION

The present invention is essentially aimed at eliminating the above disadvantages.

In particular, the present invention is aimed at providing an indexing system which eliminates the disadvantages of multiple-piston systems, yet preserving their advantages, and therefore has the following important objects:

to provide a chuck wherein rotation and locking of the dividing pivot of the indexing device follow one another with continuity in the sense that the end of the former and the beginning of the latter occur simultaneously, without the pivot being temporarily left free;

to provide a chuck with an improved indexing device which has small bulk, a simplified structure and great reliability in use;

to provide an indexing device which is adapted to produce angular movements of the jaws smaller than 90° and in particular movements with an angular step of 45°;

to provide an indexing chuck wherein the grip force on the part is constant and independent from centrifugal force.

In order to achieve these important objects and others which will become apparent from the following detailed description, the present invention relates to an automatic indexing chuck as defined in the claims.

The mandrel object of the invention thus comprises only two hydraulic reversible circuits, that is an indexing and gripping circuit and a compensating circuit having a compensating cylinder slideably accommodating a floating piston subject to centrifugal force.

BRIEF DESCRIPTION OF THE DRAWINGS

The features and advantages of the invention will become apparent from the following detailed description and with reference to the accompanying drawings, given by way of non-limitative example, wherein.

DESCRIPTION OF THE PREFERRED EMBODIMENTS

Figure 1:
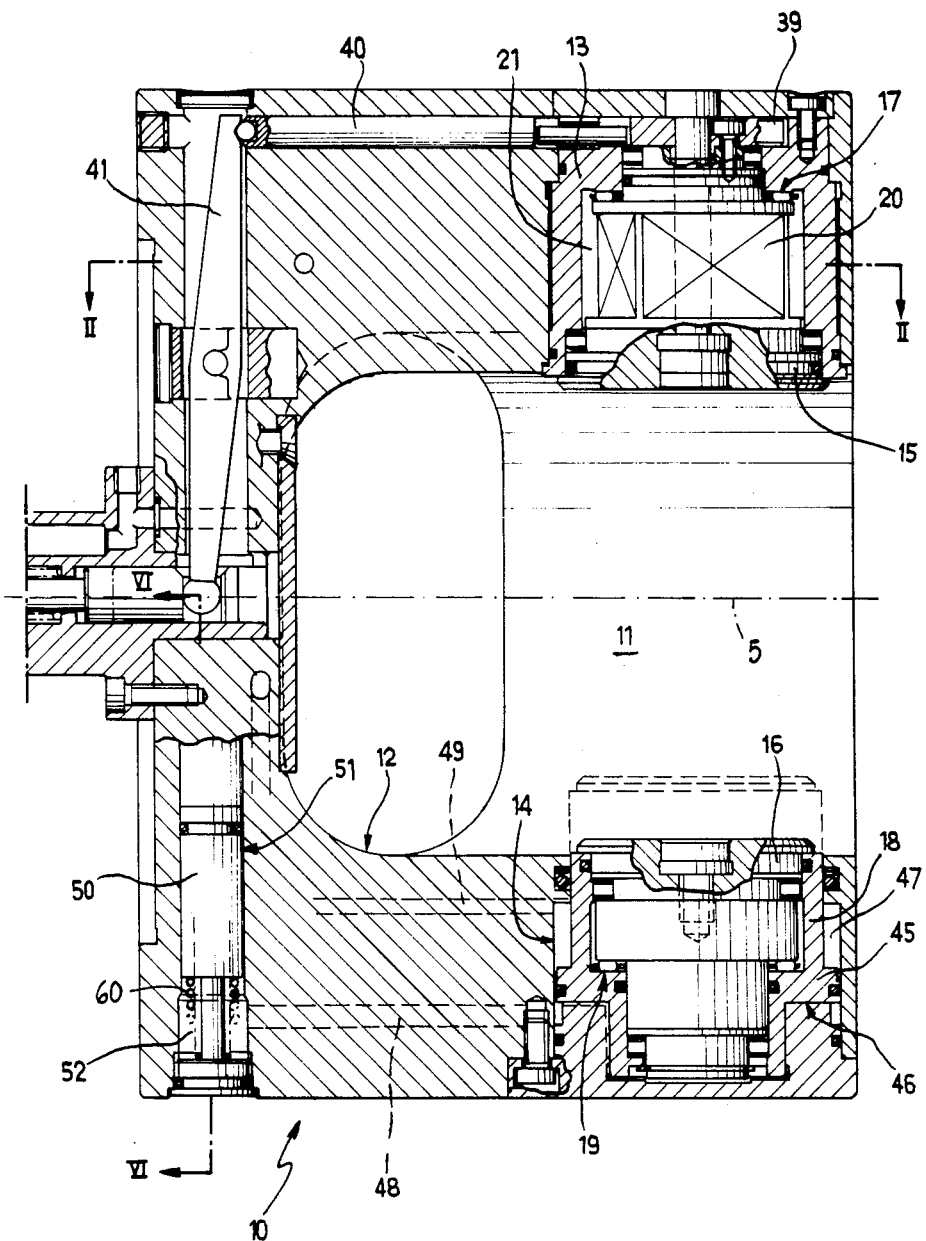
FIG. 1 is an axial cross section view of the chuck according to the present invention.

In the drawings, the reference numeral 10 indicates the body of the indexing chuck, having a conventional cylindrical shape with a rotation axis 5, an axial central cavity 11 and a pair of diametrally opposite through openings 12. A pair of clamp-holder jaws 15 and 16 are arranged aligned with the orthogonal diameter of the openings 12, in corresponding seats 13 and 14 provided at the front end of the body of the mandrel. The jaw 15 is subject to a mechanism which causes its angular indexing motions, which consist of step-by-step rotations about an axis which coincides with the diameter of alignment of the jaws. The jaw 16 is subject to a hydraulic control system which causes its radial movement towards the jaw 15, this movement being defined, in the present description, as gripping.

The jaw 15 is sealingly and rotatably accommodated in the corresponding seat 13 and opposes the gripping thrust of the jaw 16 by means of a thrust bearing 17. The jaw 16 is in turn rotatably contained within a bush 18 provided with a thrust bearing 19, said bush being sealingly slideble within the seat 14 and subject to the thrust of the control fluid.

A prismatic portion 20, the so-called dividing or indexing pivot, is formed on the body of the jaw 15; in the example illustrated it has a quadrangular cross section to produce, as will become apparent hereinafter, rotations of the jaw with an angular step of 90°. The chuck body 10 is provided with a first cylindrical cavity 22 extending in a direction parallel to the axis of rotation of the chuck body. The dividing pivot 20 is sealingly accommodated in a second cylindrical and radial cavity 21 connected to the first cylindrical cavity 22 and therefore orthogonal to the first cavity 22. As is clearly illustrated in FIG. 2, the first cavity 22 partially intersects the second cavity 21 so that the dividing pivot 20 partially projects in the cavity 22. A cylindrical sleeve 23, hereinafter referred to as locking sleeve, and having a partially closed head in correspondence of its end proximate to the dividing pivot is sealingly slideable in the first cavity 22, particularly in a first chamber of said first cavity defining on inner portion 24 and an outer portion 25 in said cavity. The lateral surface of the locking sleeve, facing the pivot 20, is provided with a through slot 26 delimited by parallel shoulders 27 of substantially triangular shape having inclined planes 28, adapted to engage by contact the dividing pivot 20 when the sleeve is in the position drawn in FIGS. 1 and 2, which corresponds to the maximum volume of the chamber 24. A cylindrical shaft 29, hereinafter referred to as dividing shaft, is contained sealingly slideable inside the locking sleeve 23, and is provided at one end with a pusher tooth 30 which traverses the slot 26 and has such a radial extension as to intercept the trajectory of the corners of the pivot 20 as will be described hereinafter.

The end of the dividing shaft 29, opposite to the tooth 30, passes through the hole of an inwardly directed annular projection, or separator, 31 which delimits a second chamber 32, adjacent to the first chamber 24 and sealingly slideably accommodating a piston 33 which is rigidly associated with the shaft 29. In said shaft an axial passage 34, having a flow restriction 35 and connecting the chambers 25 and 32, is also provided. A duct 36 leads into the outer portion 25; of the first chamber another duct 37 leads into the inner portion 24 of the first chamber and into the second chamber 32. An electrically operated valve 38 selectively connects the duct 36 to an oil delivery and the duct 37 to the of a hydraulic circuit including an oil pump or vice versa.

Figure 2:
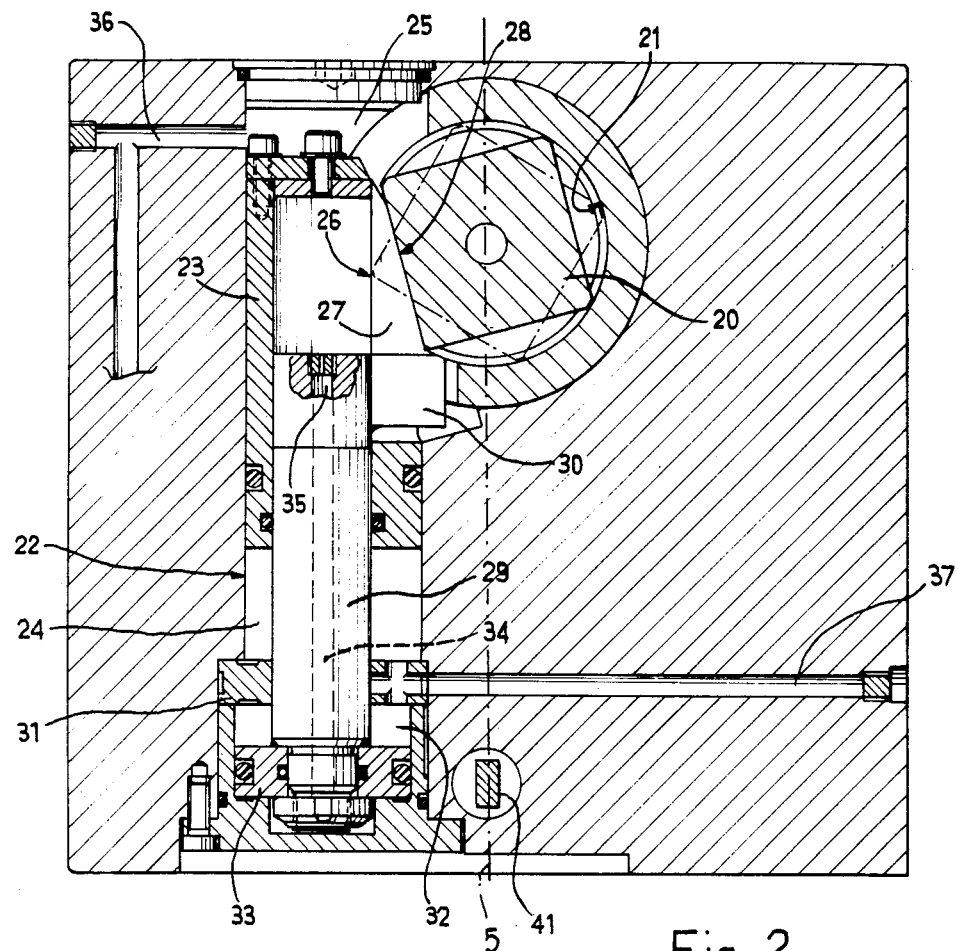
FIG. 2 is a transverse cross section view taken along line II—II of FIG. 1, illustrating a work step of the indexing device.
Figure 3:
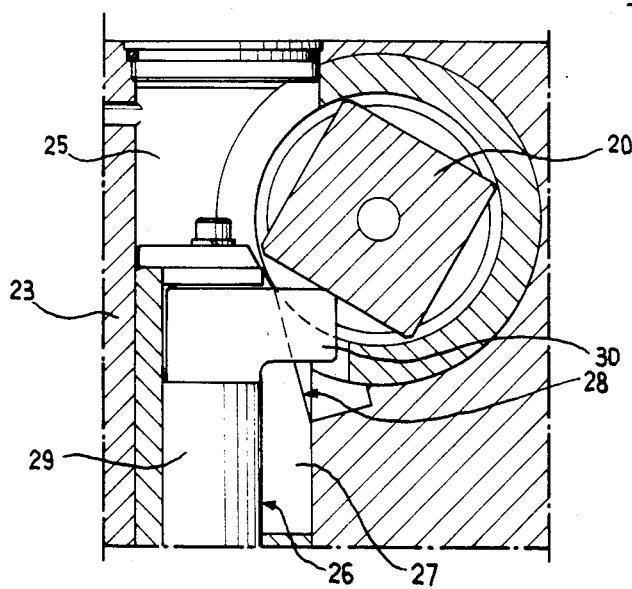
FIG. 3 is a partial cross section view, similar to the preceding one, illustrating a different work step of said device.
Figure 4:
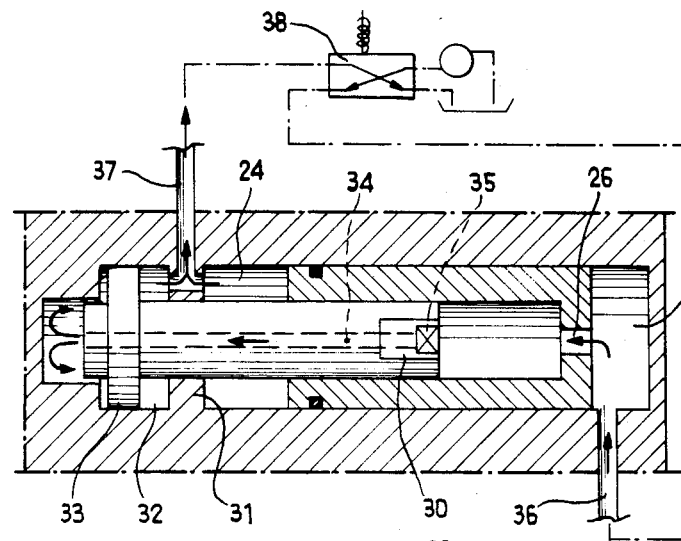
FIGS. 4 and 5 are similar schematic sectional views, rotated through 90° with respect to the cross section of FIG. 2 and illustrating in detail the fluidodynamic operation modes of the device in the two work steps of, respectively, FIG. 2 and FIG. 3.
Figure 5:
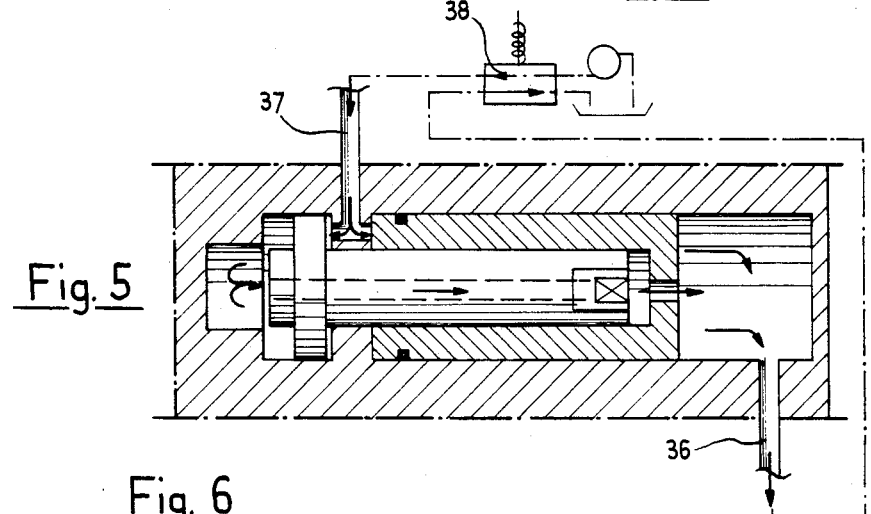
Figure 6:
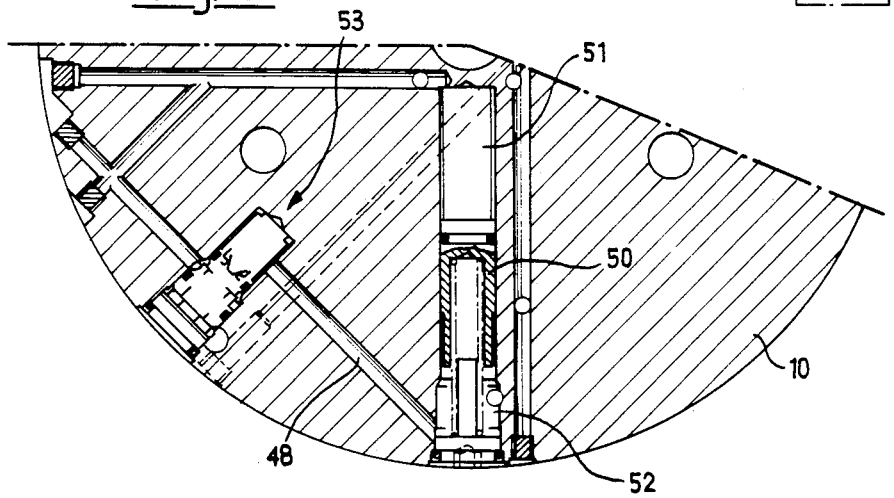
FIG. 6 is a transverse cross section view of the chuck taken along line VI—VI of FIG. 1.

The operation of the indexing device as described above is as follows:

The indexing cycle begins with unlocking of the dividing pivot 20 which is achieved by supplying pressurized oil to the chamber 25 through the duct 36 and by connecting the duct 37 to the discharge. Through the slot 26, the flow restriction 35 and the passage 34, oil flows into the portion of chamber 32 which is comprised between piston 33 and the end of shaft 29, that is the lower one with respect to FIG. 2. The oil pressure drop in correspondence of 35 and 34 causes a differential thrust on the head of the sleeve 23, which moves in the direction of disengagement between the inclined planes 28 and the dividing pivot 20. In other words, the sleeve 23 moves in the direction corresponding to the reduction in volume of the portion 24 of the first chamber and the oil present in this chamber is drained through the duct 37. Simultaneously and gradually, pressure rises in the outer part of chamber 32, and by acting on the piston 33 causes shifting of the dividing shaft 29 in the direction wherein the tooth 30 intercepts the facing corner of the dividing pivot 20; the inert oil contained in the inner part of the chamber 32 being expelled through the duct 37. As the movement proceeds, the first rotation step is completed, which causes rotation of the dividing pivot 20 by 45° (clockwise with reference to FIG. 2) with respect to the initial locking position. At the end of this first phase the locking sleeve 23 and the dividing shaft 29 are mutually arranged in a completely contracted position as illustrated in FIGS. 2 and 5. Then rotation and locking are completed by reversing the delivery of the oil, by means of the electric valve 38, to the duct 37 and connecting the duct 36 to the discharge. The pressurized oil now flows in the portion 24 of the first chamber and in the inner part of the second chamber 32, causing disengagement of the tooth 30 of the dividing shaft from the pivot 20 and the engagement between pivot 20 and inclined planes 28 of the locking sleeve 23 which, moving in the direction of increasing volume of the chamber 24. At the end of this second phase, the rotation of the dividing pivot 20 is completed until the dividing pivot returns to the locking position illustrated in FIG. 2. The oil in the outer part of chamber 32 is forced by the piston 33 into the outer portion 25 through the passage 34 and the flow restriction 35 and from there the oil is drained through the duct 36.

From the preceding description it is understood that the engagement and the disengagement of the tooth 30 and of the surfaces 28 with the dividing pivot 20 occur without discontinuity, by virtue of the reciprocating continuation movement of the dividing shaft 29 and of the locking sleeve 23 so that said dividing pivot 20 is never left free and the indexing movement is free from shocks and possible jammings.

As is clearly illustrated in FIG. 1, a cam 39 is rigidly associated with the dividing pivot 20, and its profile corresponds to the profile of the pivot 20. A tappet rod 40 cooperates with the cam 39, and by means of a rocker arm 41 transfers—for abutment and memorization purposes—the angular positions and movements of the pivot 20 to the control and drive system (not illustrated) of the mandrel, for example to a numeric control system.

Again with reference to the gripping jaw 16, from FIG. 1 it can be noted that the bush 18 is provided with a collar 45 which sealingly separates two chambers 46–47 in the seat 1. Respective ducts 48 and 49 for feeding and discharging the hydraulic fluid which causes the gripping movement and the release of the jaw 16 are connected to said chambers. Means for compensating the centrifugal force, which by acting on the jaw 16 while the mandrel is rotating tends to cause the movement thereof in the direction of reduction of the locking force, are inserted in the duct 48. These compensating means comprise a cylindrical floating mass 50, sealingly slideable, against a spring 60, in a corresponding cylindrical cavity 51 which extends radially in the body of the mandrel. In the cavity 51, the mass 50 delimitates a chamber 52, which from a hydraulic point of view is in shunt connection with the duct 48 which continues beyond the chamber and is intercepted by a known controllable one-way valve indicated at 53 and possibly by a maximum-pressure valve (not illustrated). The chamber 52 is delimited by the outer side of the mass 50, which therefore tends to reduce its volume when the centrifugal force acts upon said mass. This causes a corresponding increase in the pressure of the hydraulic fluid in the duct 48 and in the chamber 46, and the consequent compensation of the centrifugal force acting, in the opposite direction, on the mass of the jaw 16.

Naturally, the principle of the invention remaining unchanged, the details of the execution and the embodiments may be extensively variated with respect to what has been described and illustrated by way of non-limitative example, without thereby abandoning the scope of the invention.

In particular, though the concentric arrangement of the dividing shaft 29 and of the locking sleeve 23 is practically advantageous, the same may be separately contained in corresponding cylindrical chambers of the body of the mandrel, with converging axes; for example mutually arranged at 90° with respect to the dividing pivot, so long as said chambers are hydraulically interconnected so as to constitute an hydraulic system with reciprocating pistons according to what is deducible from the preceding description.

We claim:

1. An automatic indexing chuck including clamping jaws, for angular step-by-step movement of said clamping jaws, comprising:
   a chuck body;
   a dividing pivot for supporting at least one of said clamping jaws;
   a locking member having retention faces for locking said dividing pivot against rotation thereof about a pivoting axis;
   a dividing shaft having a portion engageable with said dividing pivot to cause it to rotate about said pivoting axis;
   a first cavity formed in said chuck body for accommodating said locking member and said dividing shaft for reciprocal movement thereof;
   two adjacent chambers defined by said first cavity;
   two reciprocating pistons defined by said locking member and said dividing shaft, said pistons being sealingly movable within said adjacent chambers of said first cavity;
   fluid conducting means extending between said adjacent chambers for continuously putting them into fluid flow communication;
   a first hydraulic circuit including a source of fluid under pressure and inlet and outlet ports reversibly and selectively connectable to said adjacent chambers of said first cavity;
   said hydraulic circuit, upon alternatively reversing said inlet and outlet ports, providing fluid under pressure to cause said locking sleeve and said dividing shaft to continuously move in opposite directions for consecutively unlocking, rotating and locking of said dividing pivot.

2. A chuck according to claim 1, wherein said locking member comprises a locking sleeve axially and slidably accomodating a portion of said dividing shaft adjacent said dividing pivot.

3. A chuck according to claim 1, wherein said dividing pivot is a prismatic body with planar faces extending substantially parallel to the pivot axis of said dividing pivot.

4. A chuck, according to claim 1, wherein said chuck body is provided with a second cavity sealingly and pivotally accomodating said dividing pivot and extending substantially radially of said chuck body.

5. A chuck, according to claim 3, wherein said first cavity extends axially of said chuck body and partly intersects said second cavity in a direction substantially perpendicular thereto.

6. A chuck, according to claim 4, wherein said second cavity partly intersects said first cavity so that said dividing pivot partly protrudes into said first cavity, said second cavity being in fluid flow communication with said first cavity.

7. A chuck, according to claim 1, wherein said locking sleeve is partly closed at one end thereof adjacent said dividing pivot and is provided at a lateral portion thereof close to said end with a lateral slot extending substantially axially of said locking sleeve.

8. A chuck, according to claim 7, wherein the longitudinal edges of said lateral slot are provided with substantially triangular shoulders defining projecting portions of said locking sleeve inclined with respect to the axis thereof and adapted to come into contact engagement with said lateral faces of said dividing pivot when said locking sleeve is in a completely extended position with respect to said dividing shaft.

9. A chuck, according to claim 8, wherein said dividing shaft is provided at the end thereof including said portion slidingly accomodated in said locking sleeve with a pusher tooth projecting laterally of said dividing shaft and passing through said lateral slot of said locking shaft, said pusher tooth being arranged for protruding into said second cavity so as to slidingly engage with the lateral faces of said dividing pivot and being arranged for rotating said dividing pivot by a half angular step when said dividing shaft is in a completely contracted position with regard to said locking sleeve.

10. A chuck, according to claim 8, wherein said fluid conducting means include a longitudinal duct extending axially of said dividing shaft between the opposite ends thereof, said axial duct being provided with a flow restrictor at one end thereof proximate to said pusher tooth.

11. A chuck, according to claim 9, wherein said passage means further includes said lateral slot of said locking sleeve, both said lateral slot and said axial duct being in fluid flow communication with said second cavity of said chuck body.

12. A chuck, according to claim 1, wherein said first cavity is provided with an annular projection extending inwardly of said first cavity and having a central hole for sealingly guiding said locking sleeve axially thereto, said annular cavity defining with said locking sleeve said two adjacent chambers.

13. A chuck, according to claim 12, wherein said adjacent chambers are each provided at the opposite end thereof with a lateral duct extending in said chuck body and arranged for alternative and selective connection with said inlet and outlet ports of said hydraulic system.

14. A chuck according to claim 1, wherein there are further provided actuating means acting on at least one of said clamping jaws, said actuating means including a second hydraulic circuit selectively connectable with a pressure source for causing at least one of said jaws to move within said chuck body radially thereof thereby exerting a gripping force.

15. A chuck according to claim 14, wherein said actuating means further includes means for compensating the centrifugal force exerted on said clamping jaws upon rotation of said chuck about its rotation axis.

16. A chuck according to claim 15, wherein said compensating means comprise a cylindrical mass sealingly slidable within a corresponding cavity of said chuck body extending radially thereof, said cavity being serially connected along the path of inlet duct of said second hydraulic circuit to increase the fluid pressure in said inlet duct in response to a centrifugal force.

17. A chuck according to claim 16, wherein a helical spring is provided in said radial cavity for biasing said centrifugal mass in a direction opposite to said centrifugal force.

18. A chuck according to claim 16, wherein said second hydraulic circuit includes a controllable one-way valve serially connected in said inlet duct upstream of said compensating means.

19. A chuck according to claim 1, further comprising sensing means associated with said dividing pivot, said sensing means including a cam rigidly mounted on said dividing pivot and a rocker-arm tappet cooperating with said cam for transducing the indexing of said dividing pivot into signals acting on chuck controlling means.

* * * * *